United States Patent [19]

Knabel et al.

[11] Patent Number: 4,913,497

[45] Date of Patent: Apr. 3, 1990

[54] BELT TIGHTENER FOR SEAT BELTS IN VEHICLES

[75] Inventors: Walter Knabel, Murnau/Staffelsee; Josef Mayer, Weichs; Stephan Wentker, Dachau, all of Fed. Rep. of Germany

[73] Assignee: Britax-Kolb GmbH & Co., Dachau, Fed. Rep. of Germany

[21] Appl. No.: 221,332

[22] Filed: Jul. 19, 1988

[51] Int. Cl.⁴ ..................... B60R 21/00; A47C 31/00
[52] U.S. Cl. ..................................... 297/480; 280/806
[58] Field of Search ......................... 297/480; 280/806

[56] References Cited

U.S. PATENT DOCUMENTS 4,427,216  1/1984  Kato et al. ................... 297/480 X
4,447,017  5/1984  Inukai ............................. 297/480

FOREIGN PATENT DOCUMENTS

0195268  9/1986  European Pat. Off. .
2655491  6/1978  Fed. Rep. of Germany ...... 297/480
3216015  12/1986  Fed. Rep. of Germany .

Primary Examiner—James T. McCall

[57] ABSTRACT

A belt tightener for seat belts in vehicles comprises a device for moving the belt buckle in a belt-tightening sense and for locking the belt buckle at the end of the tightening movement, which device is activated by a so-called vehicle-sensitive system in response to an acceleration or deceleration in excess of predetermined critical values. In that belt tightener, the bracket which carries the buckle is guided for a longitudinal displacement in a housing, which is connected to the sheet metal frame of the seat or to another part of the vehicle and said housing is provided with means which permit a pull-in movement of the bracket and block its movement in the opposite direction, the belt buckle or the bracket is connected to one end of a preferably tensile element, which at its other end is connected to an energy storage device, which preferably consists of a pre-stressed spring and which in case of relaxation imparts a pull-in movement via the tensile element to the belt buckle, and a locking device for retaining the spring in its prestressed position is controlled by the vehicle-sensitive system in such a manner that said locking device will be disabled in response to accelerations in excess of a predetermined value.

26 Claims, 4 Drawing Sheets

BELT TIGHTENER FOR SEAT BELTS IN VEHICLES

BACKGROUND OF THE INVENTION

1. Field of the Invention

This invention relates to a belt tightener for seat belts in vehicles, comprising a device for moving the belt buckle in a belt-tightening sense and for locking the belt buckle at the end of the tightening movement, which device is activated by a so-called vehicle-sensitive system is response to an acceleration or deceleration in excess of predetermined critical values.

2. Description of the Prior Art

The safety which is afforded by seat belts in vehicles can be increased further by the provision of a belt tightener, which serves to tighten the seat belt in response to the acceleration or deceleration which occurs immediately after a crash or other accident. As a result of said tightening the person to be protected is held by the belt in his or her seat against the seat and the backrest before the person can pull out the belt owing to the inertial forces of the body of that person and his or her movement relative to the vehicle. As the belt is tightened in case of a crash or other accident, the person to be protected is virtually coupled to the seat so that he or she will participate in the deceleration of the vehicle at a very early time. The tightening of the belt will also decrease the distance over which the person to be protected can fall forwardly in case of an accident so that a strong impact of the head or other parts of the body of the person on the steering wheel or other parts of the vehicle can be prevented. On the other hand, the belt cannot be tightened by means of the belt buckle unless the belt is blocked in the belt retractor before it is tightened. That blocking is ensured in that the belt retractor is also provided with a so-called vehicle-sensitive system, which will block the belt reel in response to a lower acceleration so that the belt reel will be in a blocked state before the belt is tightened by the response of the vehicle-sensitive system for the tightener, which latter system is responsive to higher accelerations.

SUMMARY OF THE INVENTION

It is an object of the invention to provide a belt tightener which is the kind described first hereinbefore and which is structurally simple and reliable in operation.

That object is accomplished in accordance with the invention in that the bracket which carries the buckle is guided for a longitudinal displacement in a housing, which is connected to the sheet metal frame of the seat or to another part of the vehicle and said housing is provided with means which permit a pull-in movement of the bracket and block its movement in the opposite direction, the belt buckle or the bracket is connected to one end of a preferably flexible tensile element, which at its other end is connected to an energy storage device, which preferably consists of a prestressed spring and which in case of relaxation imparts a pull-in movement via the tensile element to the belt buckle, and a locking device for retaining the spring in its prestressed position is controlled by the vehicle-sensitive system in such a manner that said locking device will be disabled in response to accelerations in excess of a predetermined value. The belt tightener in accordance with the invention can be embodied in a simple and rugged structure.

The bracket suitably consists of a rail, which is longitudinally slidably guided between pins and/or rollers, which support the rail on both sides, and said rail is provided with a row of holes, which are adapted to receive a preferably spring-loaded locking member for preventing a pull-out movement. The device which prevents a movement only in one direction may alternately consist of a freewheel-like locking device for locking in one sense of rotation. Where such freewheel is provided, it may be connected to the bracket by a gear. Alternatively, the bracket may be made of a flexible material which has an adequate strength; in that case a locking device which comprises gripping jaws will be required.

In accordance with a further feature of the invention the tensile element is connected to a tie rod, which is adapted to be locked by a toggle joint system, which is operable by the vehicle-sensitive system, said tie rod extends through a helical compression spring and the tie rod when it is in its locked position causes said spring to be compressed between a plate that is secured to the end of the tie rod and a cover plate, which has a through bore, through which the tie rod extends. The prestressed compression spring constitutes an energy storage device, which can be activated to impart the required pull-in movement to the belt buckle via the tensile element.

In accordance with a further feature of the invention the toggle joint system comprises a locking lever, which is pivoted in the housing and is provided with a locking nose, which extends into a detent indentation of the tie rod, one arm of a toggle joint is pivoted to the formed portion of said locking lever, the other arm of the toggle joint is movably mounted on a pin, which is fixed to the housing, and in the locking position the toggle joint is held in an extended position by a device which is operable by the vehicle-sensitive system. The vehicle-sensitive system may consist of a mechanical system, an electromechanical system or an electronic system.

In a simple embodiment the vehicle-sensitive system comprises a ball, which is held between a socket member and an abutment member, and one of said members is connected to the toggle joint, which is biased by a spring in such a manner that in response to a certain acceleration which is indicative of a crash or of a dangerous accident that ball will depart from the socket so that the toggle joint will buckle to unlock the tie rod.

Alternatively, two joggle joints may be combined in such a manner that the socket or the abutment is connected to the hinge of a second toggle joint, the arms of which are pivoted at the hinge of the first toggle joint and in the housing, respectively, and the hinge of the second toggle joint is biased by a spring in such a manner that in response to a predetermined acceleration, which is indicative of a need for an action to protect the occupants of the vehicle, the ball will depart from the socket so that both toggle joints will buckle so as to unlock the tie rod. Because the forces by which the ball is gripped are decreased, that double toggle joint system permits a more exact adjustment of the accelerations to which the vehicle-sensitive system is to be responsive.

The socket or the abutment for the ball may be adjustable by means of an adjusting screw for changing the initial stress of the spring which biases the hinge of the first or second toggle joint.

In another embodiment, that arm of the toggle joint which is mounted at a fixed location in the housing consists of a bell-crank lever, the ball is gripped between the free arm of said bell crank lever, which free arm protrudes over the hinge, and a member that is fixed to the housing, and the detent flanks of the detent nose and of the detent indentation are so beveled that a moment in an unlocking sense is exerted on the locking lever. In that embodiment different accelerations which initiate an unlocking action may be preset because the socket for holding the ball is adjustable in a guide provided on the free lever arm.

The guide housing for the bracket that carries the belt buckle, on the one hand, and the spring housing, inclusive of the locking toggle joint system that is controlled by the vehicle-sensitive system, on the other hand, are suitably interconnected. A pulley for deflecting a rope that constitutes the flexible tensile element may be movably mounted in the guide housing.

In accordance with a further feature of the invention the guide housing and the spring housing are secured to the seat of the vehicle and a locking member is connected to the guide housing and in response to tension exerted on the guide housing via the bracket for the belt buckle positively interengages with a tie rod that is fixedly connected to the vehicle. In that case the guide housing and the spring housing may be lighter in weight because in case of a crash or other accident the guide housing is directly coupled to a tie rod that transmits the tensile forces to the vehicle.

In accordance with a further feature of the invention the housing is pivoted to the seat and the locking member consists of a lever, which is pivoted in the housing and has sawtoothlike teeth and at a distance from its pivotal mounting is provided with a crankpinlike pin or like which so engages a part that is fixed in the vehicle that a pivotal movement of the housing caused by a tension exerted on the housing will pivotally move the lever toward the tie rod, which has complementary teeth, whereby said teeth interengage and the housing is coupled to the tie rod. With that design the seat can be adjusted in the usual manner without a displacement of the belt buckle relative to the seat so that the person to be protected will find the belt buckle always at the same location regardless of the adjustment of the seat. In order to ensure in a simple manner that the tie rod will be in position for engagement by the locking lever, the tie rod may consist of a lever, which is pivoted to the vehicle and is guided in the guide housing.

The invention also relates to a belt tightener which is of the kind described first hereinbefore and in which the belt buckle is secured to a tightening lever, which is pivoted to a plate that is fixed to the vehicle, said tightening lever is biased by a spring in a tightening sense and is held in an inactive position by a locking member, which in response to a critical acceleration or deceleration unlocks the tightening lever, which is blocked by a ratchet in its tightening end position relative to the part which is fixed to the vehicle, and the ratchet member cooperates with a pawl lever that is pivoted to the tightening lever.

Such a belt tightener is known from European Patent Publication No. 195,268. In that known belt tightener the spring which biases the tightening lever consists of a torsion spring rod, which is disposed in a tubular housing, which at its inner end is secured to the plate, and the free end of the torsion spring rod acts on the tightening lever. In response to an acceleration which is indicative of a crash, the acceleration of the torsion spring rod will displace the latter in such a manner that a lever which is connected to the torsion spring rod and is coupled to the tightening lever by a pin slot coupling is released by an abutment that is constituted by a ball bearing and said coupled lever is then caused to pull the tightening lever to its belt-tightening position. In further embodiments of the known belt tightener, acceleration sensors are provided, which consist of a lever that is mounted at its lower end, and a gravity pendulum, and which in response to a critical acceleration release the tightening lever, which is otherwise blocked by said sensors and which when released is pivotally moved to its tightening position by the direct action of the torsion spring rod that is connected to said tightening lever. A ratchet is provided to hold the tightening lever in its tightening position.

In a belt tightener of that kind the object underlying the invention is accomplished in that the pawl lever is guided in a slot of the plate which is fixed to the vehicle and at least one edge of the slot is formed with the ratchet teeth.

In a desirable embodiment the pawl lever is movably mounted on a pivot which is connected to the tension lug of the belt buckle. In the known belt tightener the belt buckle is connected to the pawl lever, whereby the blocking interengagement of the teeth of the pawl lever with the ratchet teeth may be adversely affected.

The slot which is provided with the ratchet teeth and is formed in the plate that is fixed to the vehicle suitably extends substantially along a straight line in the direction of the tension lug and the pivot is guided in a slot of the tightening lever.

In accordance with a further feature of the invention the pawl lever consists of a disk and is formed with teeth for interengaging with ratchet teeth which are formed on both sides of the slot. In that design the disklike pawl lever is vir-tually canted between the toothed edges of the slot and will thus cause the belt buckle to exert a strong retaining force.

In accordance with a further feature the slot is concentrically curved about the pivotal axis of the tightening lever and the pawl lever and the pivotally movable end of the tightening lever are pivoted on the pivot for the tension lug. The tightening lever is suitably biased by a spiral spring, which is secured at one end adjacent to the pivot for the tightening lever and at its other end bears on the tightening lever. In accordance with a further feature of the invention the vehicle-sensitive system comprises a sensor lever, which is movably mounted at its lower end and constitutes an inverted gravity pendulum and as it is deflected from a position of rest releases a lever by which the tightening lever is blocked. In that arrangement one arm of a two-armed lever may engage the tightening lever to retain the same and the angled other arm of said two-armed lever may be blocked by a pin of the pendulum when the latter is in position of rest.

In accordance with a further feature a second two-armed lever has one arm that is provided with a hooklike projection, which engages the other arm of the first mentioned two-armed lever, and the other arm of the second two-armed lever is provided with a pin, which extends into a window that is formed in the pendulum. In position of rest one side edge of the windowlike aperture in the spring-loaded sensor lever bears on the pin. Under the action of a critical acceleration, the sensor lever will be deflected against spring force so that the opposite side edge of the windowlike aperture will strike on the pin to move the lever from its retaining and blocking position.

DETAILED DESCRIPTION OF THE PREFERRED EMBODIMENTS

Illustrative embodiments of the invention will now be explained more in detail with reference to the drawing.

Figure 1:
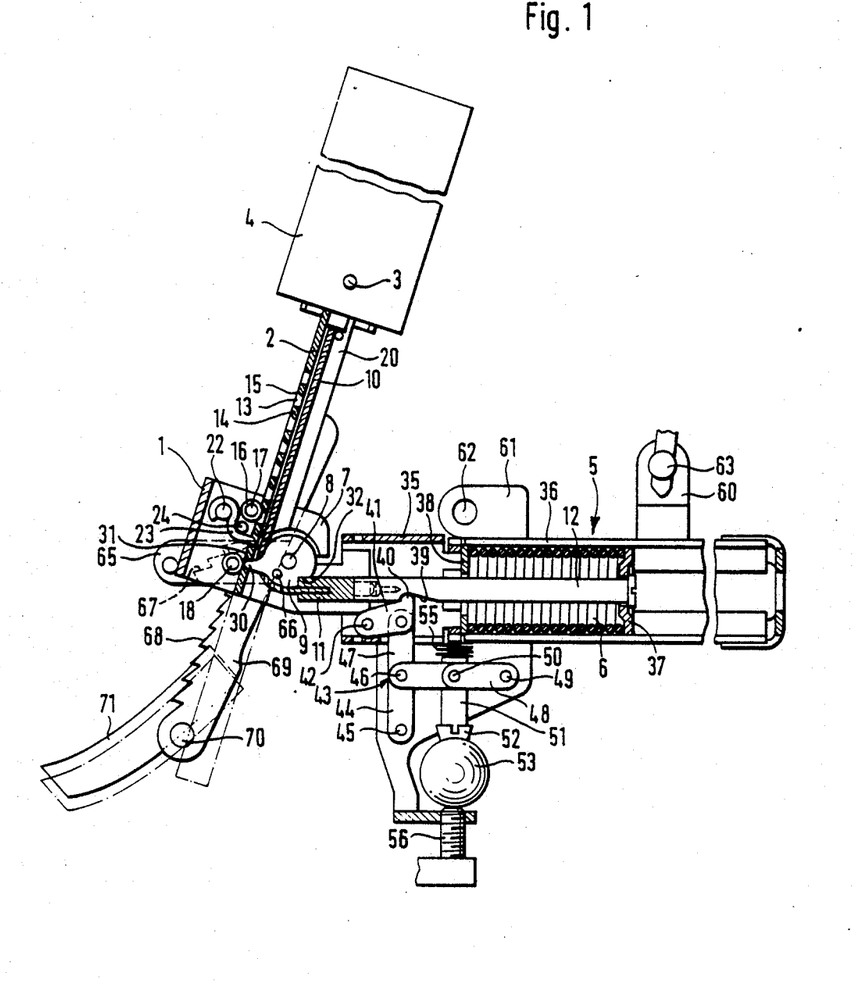
FIG. 1 is a longitudinal sectional view provided with means for locking the guide housing in case of need.

A guide housing 1 serves to guide the channel-shaped guide rail 2, which is hinged by the hinge 3 to the belt buckle 4. The guide housing 1 is rigidly connected to the spring housing 5, in which the prestressed coil spring 6 is held.

The guide housing 1 consists of a sheet metal element, which has been bent to a U-shape and the legs 7 of which constitute the side walls of the guide housing and are connected to the spring housing 5. A pully 9 is rotatably mounted on an axle 8, which connects the side walls 7. The tension rope 10 is trained in an annular groove around the pulley 9. The upper end of the tension rope 10 is connected to the top end of the rail 2 or to the buckle 4. The other end of the tension rope 10 is connected to the tie rod 12 by a fastener 11.

The web portion of the rail 2 is formed with rectangular apertures 13, which constitute a row of holes and are separated from each other by runglike lands 14, which have rounded lugs 15 on that side which is remote from the buckle 4. On both sides of the row of holes, the web of the rail bears in the guide housing 1 on slide bushings 16, which are slidably fitted on pins 17, 18, which are held in the side walls 7. The legs 20 of the rail 2 extend on opposite sides of the pulley 8 and their end edges are guided on the axle 8 of the pulley. Separate pins for guiding the side edges of the legs 20 may be provided in the side walls 7. A locking lever 23 is pivoted to a pin 22, which is held between the side walls 7. By a coil spring having end legs, or the like, not shown, the locking lever 23 is held in engagement with the pin 24, which is also held between the side walls 7. When the locking lever 23 bears against the pin 24, the wedge-shaped end portion of the lever 23 will extend into a hole 13 of the row of holes of the rail 2. During a displacement of the buckle 4 toward the guide housing 1, the locking lever 23 will jump over the runglike lands 14 as over ratchet teeth and in response to a pull-back movement will fall into an aperture so as to block the latter.

On the side of the annular groove for the tension rope 10, the pulley 9 is provided with projecting noses 30, which extend into a recess 31 of the rail to hold the latter in its normal position. In order to maintain that normal position the pulley 9 is formed with a steplike indentation 32, which receives the connector 11 of the tie rode 12 when the same is in locked position. By that locking of the pulley, the carrying rail 2 is fixed in position so that it cannot be depressed even when the latch striker of the belt is forced into the buckle 4 with a substantial force. The side walls 7 of the guide housing 1 have extensions by which said housing 1 is connected to an intermediate housing 35, which is connected to cylindrical housing 36, which contains the coil spring 6. The tie rod 12 extends through the coil spring 6 and at its other end carries a spring abutment 37, which is screwed on said tie rod. In the locked position which is illustrated, the tension spring 6 is compressed between the spring abutment 37 and a cover-like front wall 38 of the housing in such a manner that the convolutions of said spring substantially bear on each other. The housing wall 38 has a central bore, through which the tie rod 12 extends.

When the convolutions of the compression spring 6 bear on each other under pressure a detent indentation 39 formed in the tie rod 12 will be adjacent to the intermediate housing 35 and will be the detent nose 40 of a locking lever 41, which is pivoted on the pin 42 in the intermediate housing 35. One arm 42 of the toggle joint 43 is pivoted to the locking lever 41 near its other end. The other arm 44 of the toggle joint 43 is pivoted on the pivot 45, which is fixed to the housing. The two arms, 42, 44 are hinged by a hinge pin 46, on which the arm 47 of the second toggle joint 48 is pivoted. The other arm 48 of the toggle joint 48 is pivoted on a pivot 49, which is fixed to the housing. The hinge pin 50 of the second toggle joint 49 carries on its underside a socket 52, which is connected to the retaining member 51. The sensor ball 53 of the vehicle-sensitive system is gripped between the socket 53 and an abutment that is fixed to the housing. The hinge pin 50 is biased by a biasing spring 55, which has a top end that bears on the housing 35, 36. The abutment for the ball 53 is constituted by the end face of the adjusting screw 56, by which the ball 53 is held between the socket 52 and the abutment. The retaining force is so selected that the ball will be pulled out of its mounting under the action of accelerating forces amounting to about 5 g (5 times the acceleration due to gravity). As the ball 53 is thrown out of its seat, the compression spring 55 will cause the toggle joints 48 and 53 to collapse so that the detent nose 40 is pulled out of the detent indentation 39 of the tie rod 12 and the latter is moved to the right and carries the buckle 4 along. When the belt has been tightened in the end position, the carrying rail 2 is locked by the locking member 23.

The housing 5 is connected by the carrying straps mounting lugs 60, 61 to a side plate or the like of the seat. The mounting lug 61 has a bearing bore 62 and by said bearing bore is pivoted on a pivot pin of the side plate. The mounting lug 60 is provided with a pin, which is guided in a slot of the side plate in such a manner that the housing 5 is pivoted on the pivot pin of the mounting lug 61.

A locking lever 65 is pivoted on the axle 8 of the pulley 9 and at a distance from the axle 8 is provided with a crankpinlike pin 66, which extends into an associated bore of the side plate or the like. When tension acting on the buckle 4 imparts to the housing 5 a pivotal movement in the clockwise sense, the crank which connects the side plate to the locking lever 65 will impart to the latter a pivotal movement in the counter-clockwise sense. In its forward portion the locking lever 65 is provided with sawtoothlike teeth 67. The pivotal movement of the locking lever 65 causes said teeth to interengage with the teeth 68 of a tie rod 69, which is hinged to the vehicle by a hinge 70. To maintain the interengaging position the tie rod 69 is guided on its rear side on the axle 8 of the pulley 9. The range of adjustment of the seat is indicated by the range 71 for adjustment in height. In case of danger, the teeth of the locking lever 65 can interengage with the teeth 68 of the tie rod 69 regardless of the position of the seat so that the guide housing 1 and with it the carrying rail 2 are directly connected to the tie rod 69.

Figure 2:
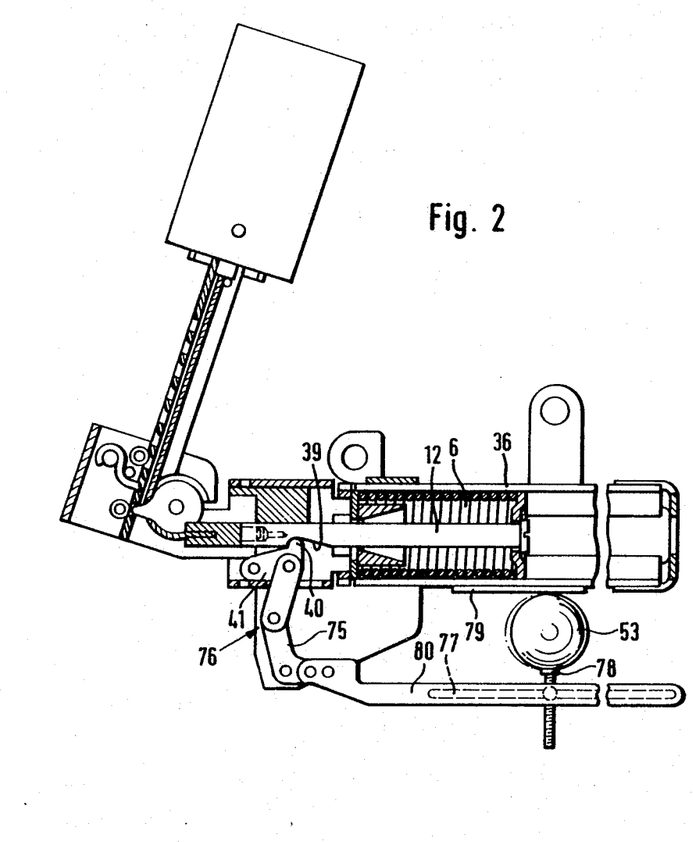
FIG. 2 is a longitudinal sectional view showing a second embodiment of a belt tightener.
Figure 3:
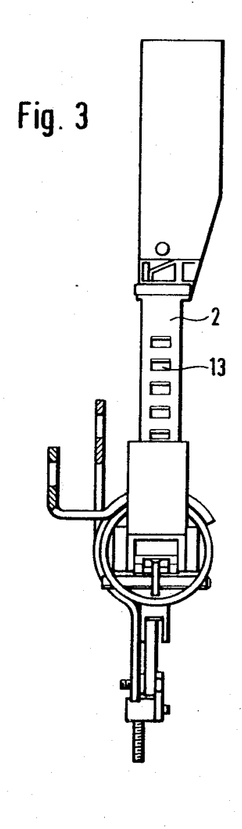
FIG. 3 is a front elevation showing the belt tightener of FIG. 2.

The embodiment shown in FIG. 2 and 3 differs from the embodiment of FIG. 1 essentially only in that the second toggle joint 48 has been omitted and the arm 75 of the toggle joint 76 consists of a bell crank lever, which has a freely protruding lever arm 76, which is formed with a slot 77 for guiding th socketlike retaining member 78 for the ball 53. The ball 54 is gripped between the retaining socket 78, which is adjustable in the guide slot 77, and a abutment plate 79, which is provided on the underside of the housing 36 and is substantially parallel to the guide slot 77.

The detent nose 40 and the detent groove 39 of the tie rod 12 have beveled and rounded detent flanks, which in the locking position bear on each other so that the spring exerts on the detent lever 41 a component of force which tends to impart to the detent lever 41 a pivotal movement in the unlocking sense. By means of the toggle joint 76 that component of force is transmitted to the lever arm 80 so that the ball 53 is gripped between the socket 78 and the abutment plate 79 with a reaction force that depends on the effective length of the lever arm. In that arrangement the socket 78 can be adjusted in the guide slot 77 to adjust the acceleration which is required to throw the ball 53 from its seat and to effect a collapse of the toggle joint 76 so as to release the tie rod 12.

Figure 4:
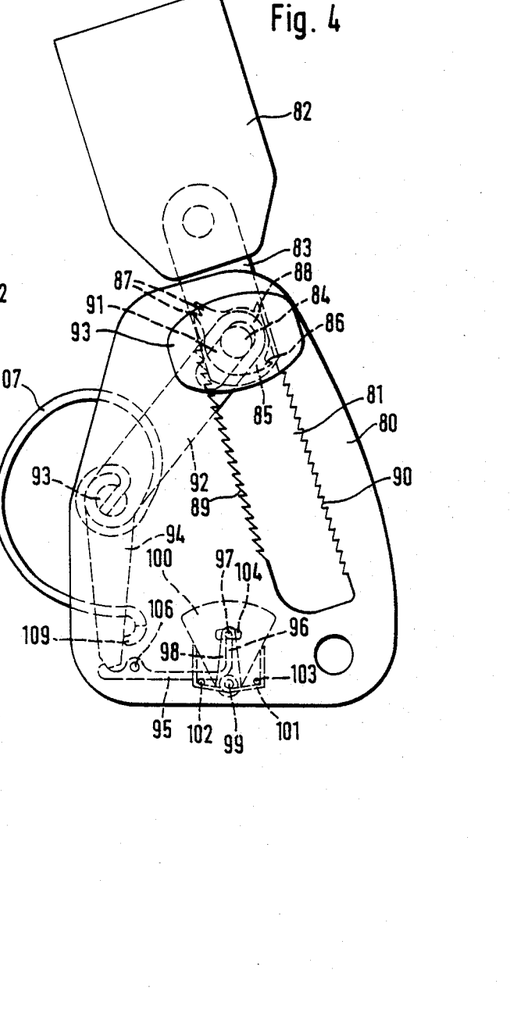
FIG. 4 is a side elevation showing a third embodiment of a belt tightener.
Figure 5:
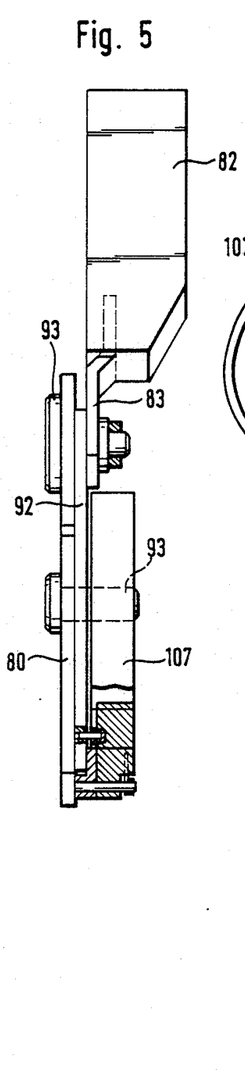
FIG. 5 is a front elevation showing the belt tightener of FIG. 4.

The illustrative embodiment shown in FIGS. 4 and 5 comprises a plate 80, which is formed with a slot 81, which extends substantially in the direction of a tension lug 83, which is connected to the belt buckle 82. Adjacent to its lower end the tension lug 83 is provided with a pivot 84, on which a disklike pawl lever 85 is rotatably mounted. The pawl lever 85 is provided with detent teeth 86, 87 on mutually opposite sides. A leaf spring 88 tends to rotate the pawl lever 85 in th counterclockwise sense. The side edges of the slot 81 are provided with ratchet teeth 89, 90.

The pivot 84 on the tension lug 83 extends also through a slot 91 of a tightening lever 92, which is pivoted on a pivot 93, which is connected to the plate 80. The pivot 84 of the tension lug 89 is provided with a slide plate 93 on that side which is opposite to the plate 80. That slide plate overlaps the toothed edges of the slot 81 as is illustrated.

As is illustrated, the tightening lever 92 consists of a bell-crank lever, which has a depending arm 94 which is held in its inactive position by one arm of a bell-crank lever 95, which has an angled other arm 96 that is blocked by a pin 97 of a retaining lever 98. A pendulum 100 which has an upwardly directed bob is pivoted on the pivot 99 of the retaining lever and constitutes a sensor lever. In its illustrated position of rest that pendulum is held by the angled legs of a coil spring 101, which has a coiled central portion that is held in position on the pivot 99. The angled portions of the end legs of the coil spring 101 bear on pins 102, 103 so that the coil spring 1 retains the sensor lever 100 in its central position. The pin 97 of the retaining lever 98 extends through a window 104 of the sensor lever 100 os that in case of a deflection of the sensor lever 100 in respose to an overcritical acceleration the side edges of the window will strike against the pin 97 so that a pivotal movement is imparted to the retaining lever 98 and to two-armed lever 95 that is pivoted on the pin 106 can release the tightening lever 92, 94.

The tightening lever 92 is biased by a spiral spring 107, which tends to rotate that lever in a clockwise sense. The inner end of the coil spring 107 is secured in a slot or groove of the pivot 93. The free end 109 of the spiral spring bears on the arm 94 of the tightening lever 92.

Figures 6, 7:
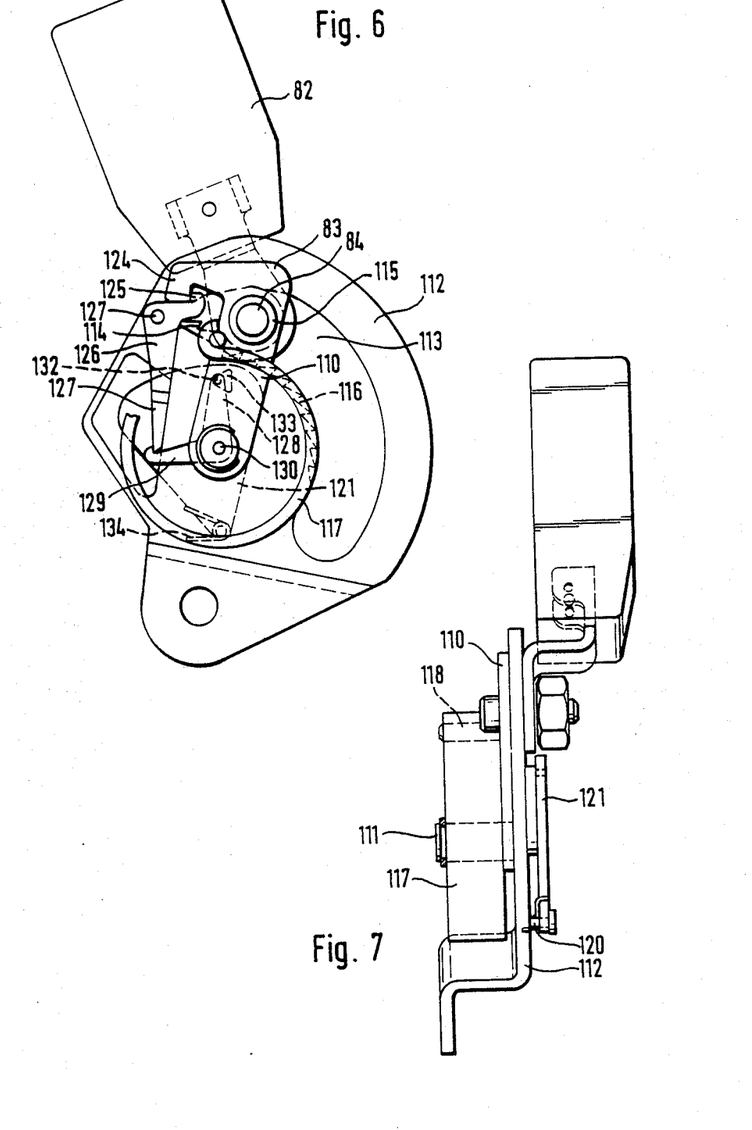
FIG. 6 is a side elevation showing a fourth embodiment of a belt tightener.
FIG. 7 is a front elevation showing the belt tightener of FIG. 6.

In the embodiment shown in FIGS. 6 and 7 the top end of the tightening lever 110 is rotatably mounted on the axle 84 of the tension lug 83 of the belt buckle 82. The tightening lever 110 is pivoted on the pivot 111, which is secured to the plate 112, which is fixed to the vehicle. The plate 112 is formed with a slot 113, which is concentrically curved around the pivot 111 and in which a disk 115 is guided, which is provided with pawl teeth 114 and is rotatably mounted on the pivot 84 of the tension lug 83. The innter edge of the slot 113 is formed with ratchet teeth 116, which interengage with the pawl teeth 114 of the pawl disk 115 during a pivotal movement of the tightening lever 110 in the clockwise sense under the action of the spiral spring 117. The pawl disk 115 is biased by a coil spring (not shown) having end legs, to rotate in a counterclockwise sense.

The spiral spring which biases the tightening lever 110 is secured at its inner end to the pivot 111 and at its outer end bears on a pin 118, which is connected to the tensioning lever 110.

A pendulum 121 having an upwardly disposed bob is pivoted on a pivot 120, which is connected to the plate 112. That pendulum constitutes sensor lever.

The tightening 110 is provided with a hook-shaped upper portion 124, which is held in an inactive position of rest by a hook-shaped abutment portion 125 of a two-armed lever 126, which is pivoted on the pin 127 of the plate 112. The other arm of the lever 126 is provided with a double-angled portion 127, which extends through a window of the plate 112 and on the opposite side of the plate is held by a bell-crank lever 128 in a position in which it blocks the tensioning lever 112. The end of the arm 127 extends behind a hook-shaped portion of the arm 129 of the bell-crank lever 128. The bell-crank lever 128 is pivoted on a pin 130, which is secured to the plate 112. The upwardly directed arm of the bell-crank lever 128 carries a pin 132, which bears on one edge of a window 133 of the sensor lever 121. By means of a coil spring 134 having end legs the sensor lever 121 is held in engagement with the pin 132. Under the action of a critical acceleration the sensor lever 121 will be pivotally moved in the counterclockwise sense so that the opposite side edge of the window 133 will strike on the pin 132 and the bell-crank lever 128 will thus be pivotally moved out of its retaining position. As a result, the bell-crank lever 126 will also be released and will release the tightening lever 110. When the tightening lever 110 has been unlocked, it is pivotally moved in the clockwise sense by the spiral spring 117. As a result, the pivot 84 of the tension lug 83 is moved into the lower portion of the slot 113 and is locked there by the interengagement of the pawl teeth 114 and the ratchet teeth 116.

We claim:

1. A belt tightener for seat belts in vehicles, said belt tightener including a device for moving the belt buckle in a belt-tightening sense and for locking the belt buckle at the end of the tightening movement, said device activated by a vehicle-senstive system which activates said belt tightener in response to an acceleration or deceleration in excess of predetermined critical values, characterized in that the belt buckle is carried by a bracket which is guided for a longitudinal displacement in a housing, said housing being connected to the frame of the seat part of the vehicle and being provided with means which permit a pull-in movement of the bracket and block its movement in the opposite direction, the belt buckle being operatively coupled to one end of a tensile element, which at its other end is connected to an energy storage device, said energy storage device including a prestressed spring and and being adapted in case of relaxation to impart a pull-in movement via the tensile element to the belt buckle, and a locking device for retaining said spring in its prestressed position, said locking device being controlled by the vehicle-sensitive system in such a manner that said locking device will be disengaged in response to accelerations in excess of a predetermined value to cause tightening of the seat belt buckle.

2. A belt tightener for seat belts in vehicles, said belt tightener including a device for moving the belt buckle in a belt-tightening sense and for locking the belt buckle at the end of the tightening movement, said device being activated by a vehicle-sensitive system which activates said belt tightener in response to an acceleration or deceleration in excess of predetermined critical values, characterized in that the belt buckle is carried by a bracket which is guided for a longitudinal displacement in a housing, said guide housing being connected to part of the vehicle and being provided with means which permit a pull-in movement of the bracket but block its movement in the opposite direction, the belt buckle being operatively coupled to one end of a tensile element, which at its other end is connected to an energy storage device, said energy storage device including a prestressed spring and being adapted in case of relaxation to impart a pull-in movement via the tensile element to the belt buckle, and a locking device for retaining said spring in its prestressed position, said locking device being controlled by the vehicle-sensitive system and said tensile member being connected to a tie rod which is slidable within a spring housing and is held in locked configuration by a toggle joint system operably coupled to and activated by said vehicle sensitive system, said prestressed spring being held in compression within said spring housing by said tie rod when in the locked configuration yet exerting a pull-in force on said tensile element when said locking device is disengaged in response to accelerations in excess of a predetermined value to cause a tightening of the seat belt, yet said seat belt buckle will be blocked from movement in the opposite direction.

3. A belt tightener according to claim 2, characterized in that the toggle joint system comprises a locking lever, which is pivoted in the housing and is provided with a locking nose, which extends into a detent indentation of the tie rod, one arm of a toggle joint is pivoted to the forward portion of said locking lever, the other arm of the toggle joint is movably mounting on a pin, which is fixed to the housing, and in the locking position the toggle joint is held in an extended position by a device which is operable by the vehicle-sensitive system.

4. A belt tightener according to claim 3, characterized in that the vehicle-sensitive system comprises a ball, which is held between a socket member and an abutment member, and one of said members is connected to the toggle joint, which is biased by a spring in such a manner that in response to a certain acceleration which is indicative of a a crash or of a dangerous accident the ball will depart from the socket so that the toggle joint will buckle to unlock the tie rod.

5. A belt tightener according to claim 3, characterized in that the vehicle-sensitive system comprises a ball, which is held between a socket member and an abutment member, the socket or the abutment is connected to the hinge of a second toggle joint, the arms of which are pivoted at the hinge of the first toggle joint and in the housing, respectively, and the hinge of the second toggle joint is biased by a spring in such a manner that in response to a predetermined acceleration, which is indicative of a need of an action to protect the occupants of the vehicle, the ball will depart from the socket so that both toggle joints wil buckle so as to unlock the tie rod.

6. A belt tightener according to claim 5, characterized in that the socket or the abutment are adjustable by means of an adjusting screw for changing the initial stress of the spring which biases the hinge of the first or second toggle joint.

7. A belt tightener according to claim 4, characterized in that the arm of the toggle joint which is mounted at a fixed location in the housing consists of a bell-crank lever, the ball is gripped between the free arm of said bell crank lever, which free arm protrudes over the hinges, and a member that is fixed to the housing, and the detent flanks of the detent nose and of the detent indentation are so beveled that a moment in an unlocking sense is exerted on the locking lever.

8. A belt tightener according to claim 7, characterized in that the socket for holding the ball is adjustable in a guide provided on the free lever arm.

9. A belt tightener according to claim 2, characterized in that the guide housing for the bracket that carries the belt buckle, on the one hand, and the spring housing, inclusive of the locking toggle joint system that is controlled by the vehicle-sensitive system, on the other hand, are interconnected.

10. A belt tightener for seat belts in vehicles, said belt tightener including a device for moving the belt buckle in a belt-tightening sense and for locking the belt buckle at the end of the tightening movement, said device being activated by a vehicle-sensitive system which activates said belt tightener in response to an acceleration or deceleration in excess of predetermined critical values, characterized in that the belt buckle is carried by a bracket which is guided for a longitudinal displacement in a housing, said guide housing being connected to part of th vehicle and being provided with means which permit a pull-in movement of the bracket and block its movement in the opposite direction, the belt buckle being operatively coupled to one end of a tensile element which, at its other end, is connected to an energy storage device, said energy storage device including a prestressed spring and being adapted in case of relaxation to impart a pull-in movement via the tensile element to the belt buckle, said tensile member comprising a flexible rope wrapped at least partially around a pulley member and being coupled to said belt buckle, and a locking device for retaining said spring in its prestressed position said locking device being controlled by the vehicle-sensitive system in such a manner that said locking device will be disengaged in response to accelerations in excess of a predetermined value to cause a tightening of the seat belt, yet said seat belt buckle will be blocked against movement in the opposite direction.

11. A belt tightener according to claim 10, further including a carrying rail coupled to said belt buckle said pulley having a nose for entering a hole in said carrying rail of the belt buckle.

12. A belt tightener according to claim 11, which further includes a tie rod coupled to said tensile element and said prestressed spring for exerting a pull-force on said tensile element when said locking device is disengaged, said pulley including an indentation for operative coupling with said tie rod when in the locking position.

13. A belt tightener for seat belts in vehicles, said belt tightener including a device for moving the belt buckle in a belt-tightening sense and for locking the belt buckle at the end of the tightening movement, said device being activated by a vehicle-sensitive system which activates said belt tightener in response to an acceleration or deceleration in excess of predetermined critical values, characterized in that
the belt buckle is carried by a bracket which is guided for a longitudinal displacement in a housing, said guide housing being connected to part of the vehicle and being provided with means which permit a pull-in movement of the bracket and block its movement in the opposite direction,
the belt buckle being operatively coupled to one end of a tensile element which, at its other end, it connected to an energy storage device, said energy storage device including a prestressed spring within a spring housing and being adapted in case of relaxation to impart a pull-in movement via the tensile element to the belt buckle, said guide housing and said spring housing being secured to a seat in the vehicle, with a seat tie rod coupled between the seat and the vehicle
a locking device for retaining said spring in its prestressed postion, said locking device being controlled by the vehicle-sensitive system in such a manner that said locking device will be disengaged in response to accelerations in excess of a predetermined value, and
a locking lever coupled to said guide housing for lockable engagement with said seat tie rod in response to a tension force exerted on the spring housing such that guide housing in directly connected to said seat tie rod when said belt tightener is activated, regardless of the position of the seat.

14. A belt tightener according to claim 13, characterized in that the spring housing is pivoted to the seat and the locking lever is pivoted in the guide housing and has sawtooth-like teeth and at a distance from its pivotal mounting is provided with a crankpin which so engages a part that is fixed in the vehicle that a pivotal movement of the spring housing caused by a tension exerted on the spring housing will pivotally move the lever toward the seat tie rod, which has complementary teeth to interengage with the teeth on said locking lever and the housing is coupled to the tie rod.

15. A belt tightener according to claim 13, characterized in that the seat tie rod consists of a lever, which is pivoted to the vehicle and is guided in the guide housing.

16. A belt tightener for seat belts in vehicles, comprising a device for moving the belt buckle in a belt-tightening sense and for locking the belt buckle at the end of the tightening movement, said device being activated by a vehicle-sensitive system in response to an acceleration or deceleration in excess of predetermined critical values, and the belt buckle being secured to a tightening lever, which is pivoted to a plate that is fixed to the vehicle, said tightening lever is biased by a spring in a tightening sense and is held in an inactive position by a locking member, which in response to a critical acceleration or deceleration unlocks the tightening lever, which is thence blocked by a ratchet in its tightening end position relative to the plate which is fixed to the vehicle, and the ratchet member cooperates with a pawl lever that is pivoted to the tightening lever, characterized in that the pawl lever is guided in a slot of the plate which is fixed to the vehicle and at least one edge of the slot is formed with the ratchet teeth for blocking the belt buckle in the tightened configuration.

17. A belt tightener according to claim 16, characterized in that the tightening lever is biased by a spiral spring.

18. A belt tightener for seat belt in vehicles, comprising a device for moving the belt buckle in a belt-tightening sense and for locking the belt buckle at the end of the tightening movement, said device being activated by a vehicle-sensitive system in response to an acceleration or deceleration in excess of redetermined critical values, and the belt buckle being secured to a tightening lever which is pivoted to a plate that is fixed to the vehicle, said tightening lever being biased by a spring in a tightening sense and being held in an inactive position by a locking member which, in response to a critical acceleration or deceleration, unlocks the tightening lever, which is thence blocked by a ratchet in its belt-tightening end position relative to the plate which is fixed to the vehicle, and the ratchet member cooperating with a pawl lever that is pivoted to the tightening lever, characterized in that said pawl lever is pivotally mounted to a tension lug attached to the belt buckle and said pawl lever is guided in a slot of the plate which is fixed to the vehicle and at least one edge of the slot is formed with ratchet teeth to block reverse movement of the belt buckle.

19. A belt tightener according to claim 16, characterized in that the slot which is provided with the ratchet teeth and is formed in the plate that is fixed to the vehicle extends substantially along a straight line in the direction of the tension lug and the pivot is guided in a slot of the tightening lever.

20. A belt tightener for seat belts in vehicles, said belt tightener including a device for moving the belt buckle in a belt-tightening sense and for locking the belt buckle at the end of the tightening movement, said device being activated by a vehicle-sensitive system which activates said belt tightener in response to an acceleration or deceleration in excess of predetermined critical values, characterized in that the belt buckle is carried by a bracket which is guided for a longitudinal displacement in a housing, said guide housing being connected to part of the vehicle and being provided with means which permit a pull-in movement of the bracket but block its movement in the opposite direction, said bracket comprising a rail which includes a row of holes and is guided for slidable movement by guide members in the guide housing, said guide members supporting the rail on opposite sides, and said holes in said bracket being adapted to receive a locking member to prevent a pull-out movement in said opposite direction, the belt buckle being operatively coupled to one end of a tensile element, which at its other end is connected to an energy storage device, said energy storage device including a prestressed spring and being adapted in case of relaxation to impart a pull-in movement via the tensile element to the belt buckle, and a locking device for retaining said spring in its prestressed position, said locking device being controlled by the vehicle-sensitive system in such a manner that said locking device will be deisengaged in response to accelerations in excess of a predetermined value to cause a tightening of the seat belt buckle yet said belt buckle will be blocked from movement in the opposite direction.

21. A belt tightener according to claim 20, wherein said locking member is spring-loaded.

22. A belt tightener for seat belts in vehicles, comprising a device for moving the belt buckle in a belt-tightening sense and for locking the belt buckle at the end of the tightening movement, said device being activated by a vehicle-sensitive system in response to an acceleration or deceleration in excess of predetermined critical values, and the belt buckle being secured to a tightening lever which is pivoted to a plate that is fixed to the vehicle, said tightening lever is biased by a spring in a tightening sense and is held in an inactive position by a locking member, which, in response to a critical acceleration or deceleration, unlocks the tightening lever, which is thence blocked by a ratchet in its tightening end position relative to the plate which is fixed to the vehicle, and the ratchet member cooperates with a pawl lever that is pivoted to the tightening lever, characterized in that said pawl lever comprises a disk which is formed with ratchet teeth and is guided in a slot of the plate which is fixed to the vehicle, said slot having ratchet teeth formed along both edges of said slot for interengaging with the ratchet teeth of said slot to block reverse movement of the belt buckle.

23. A belt tightener for seat belt in vehicles, comprising a device for moving the belt buckle in a belt-tightening sense and for locking the belt buckle at the end of the tightening movement, said device being activated by a vehicle-sensitive system in response to an acceleration or deceleration in excess of predetermined critical values, and the belt buckle being secured to a tightening lever which is pivotally attached to a plate that is fixed to the vehicle, said tightening lever is biased by a spring in a tightening sense and is held in an inactive position by a locking member which, in response to a critical acceleration or deceleration, unlocks the tightening lever, which is thence blocked by a ratchet in its belt-tightening end position relative to the plate which is fixed to the vehicle, and the ratchet member cooperates with a pawl lever that is pivotally attached to the tightening lever, characterized in that said pawl lever comprises a disk which is formed with ratchet teeth and is guided in a slot of the plate which is fixed to the vehicle, said slot being generally concentrically curved about the pivotal axis of the tightening lever with at least one edge of the slot being formed with the ratchet teeth, said belt buckle being attached to a tension lug which is pivotally mounted to the same pivot as the pawl lever and the movable end of the tightening lever.

24. A belt tightener for seat belt in vehicles, comprising a device for moving the belt buckle in a belt-tightening sense and for locking the belt buckle at the end of the tightening movement, said device being activated by a vehicle-sensitive system in response to an acceleration or deceleration in excess of predeetermined critical values, and the belt buckle being secured to a tightening lever, which is pivoted to a plate that is fixed to the vehicle, said tightening lever is biased by a spring in a tightening sense and is held in an inactive position by a locking member which, in response to a critical acceleration or deceleration, unlocks the tightening lever, which is thence blocked by a ratchet in its tightening end position relative to the plate which is fixed to the vehicle, and the ratchet member cooperates with a pawl lever that is pivotally attached to the tightening lever, characterized in that said pawl lever is guided in a slot of the plate which is fixed to the vehicle with at least one edge of the slot being formed with the ratchet teeth, and wherein said vehicle sensitive system comprises a sensor lever movably mounted at its lower end to said plate, said sensor lever comprising an inverted gravity pendulum which, when deflected from its rest position due to an acceleration or deceleration in excess of the predetermined values, deflects a lever blocking the tightening lever, thereby releasing the tightening lever.

25. A belt tightener according to claim 24, characterized in that one arm of a two-armed lever engages the tightening lever to retain the same, the angled other arm of said two-armed lever is blocked by a pin of the pendulum when the latter is in position of rest, and said pin extends in a window of the sensor lever.

26. A belt tightener according to claim 24, characterized in that a second two-armed lever has one arm that is provded with a hooklike projection, which engages the other arm of the first-mentioned two-armed lever, and the other arm of the second two-armed lever is provided with a pin, which extends into a window that is formed in the pendulum.

* * * * *